March 20, 1951   E. P. BARRETT   2,545,441
METHOD FOR FORMING GLOMERULES
Filed July 21, 1947

EDWARD P. BARRETT
INVENTOR
BY
ATTORNEY

Patented Mar. 20, 1951

2,545,441

UNITED STATES PATENT OFFICE 2,545,441

METHOD FOR FORMING GLOMERULES

Edward P. Barrett, Mound, Minn.

Application July 21, 1947, Serial No. 762,449
In Sweden April 22, 1947

1 Claim. (Cl. 18—48)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to the treatment of pulverulent materials for further processing, and has particular reference to methods and apparatus for agglomerating finely-divided materials such as metallic oxides, into nodules of controllable and substantially uniform size and shape and of sufficient strength to withstand considerable agitation without material abrasion and breakage.

In accordance with the invention, the pulverulent material is mixed with sufficient water, or other liquid, to form a plastic mass, and is then allowed to extrude through a preferably round opening or a plurality of such openings in a substantially horizontal plate or screen, which is agitated in such a way that the extrusions break off at the under surface of the plate or screen when they have attained a predetermined length. The diameter and length of the extrusions are influenced by the degree of plasticity of the mass, the size and shape of the extrusion opening or openings and the degree of agitation of the plate or screen. The resulting extrusions are usually of elongated cylindrical or ovoid shape and may be further shaped into approximately spherical form by rolling in a drum. The moisture content of the plastic material is preferably so controlled that sufficient water is retained after extrusion to keep the surface of the extrusions wet, so that the extrusions have relatively smooth surfaces and the tendency to abrade or rub off is decreased.

The moist extruded nodules, or the substantially spherical nodules produced by subsequent rolling, are subsequently dried and baked at suitable temperatures. It will be seen that the nodules are formed without substantial compression or compaction of the plastic mass, the only force utilized being gravity, so that when the liquid is driven off in the baking step, a hard, strong, yet porous, nodule results.

For a more complete understanding of the invention, reference may be had to the accompanying drawings, in which.

Figure 1:
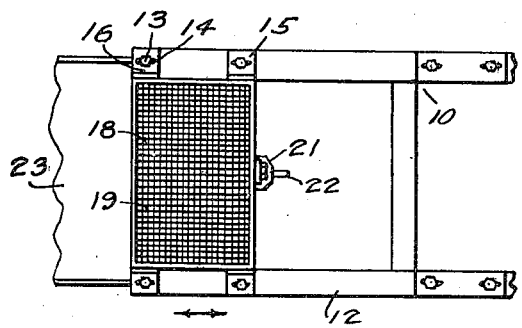
Figure 1 is a plan view of a vibrating screen constituting the apparatus of this invention for performing the method of this invention.
Figure 3:
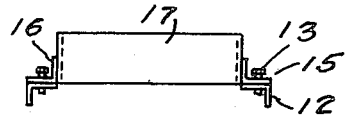
Fig. 3 is an end view thereof.
Figure 2:
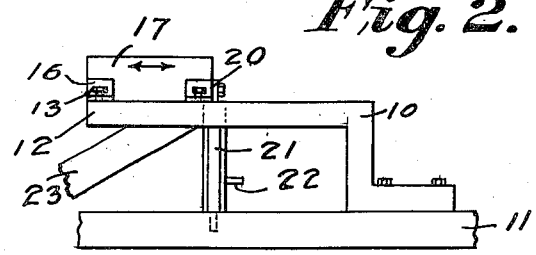
Fig. 2 is a side elevation thereof.

Referring to Figs. 1, 2 and 3 of the drawings, numeral 10 designates a frame of angle irons or the like, suitably mounted on a base 11 and having substantially horizontally extending arms 12 in whose flanges are secured four, more or less, bolts 13 projecting vertically from the flanges of the arms 12 as shown particularly in Figs. 2 and 3. The bolts 13 extend through oversize holes or longitudinal slots 14 formed in angle lugs 15. These horizontal flanges rest slidably on the horizontal arms 12 and their vertical flanges 16 are welded or otherwise secured to the sides of a suitable box 17, preferably of metal plate.

The bottom of the box 17 comprises a wire screen or, alternatively, a metal plate 18 having apertures 19 punched therein in regular arrangement similar to the openings of the equivalent screen shown. The dimensions of the openings 19 depend largely upon the material being treated and upon the size of the nodules desired. The openings 19 in the screen or plate 18 may be on the order of three-eighths of an inch in width or diameter, more or less, which represents a suitable range of sizes for metallic oxides of a fineness on the order of 100 mesh with 60% to 90% passing a 325 mesh screen. This size range may vary, depending upon the material being treated and requirements.

Mounted upon base 11 and connected to one side of the box 17 at 20 is a suitable vibrator 21 which is of conventional construction and may be one of those operated by compressed air and having air-inlet pipe 22. Alternatively, an electric vibrator may be utilized, or any other form of vibrator for oscillating box 17 in a horizontal direction back and forth along extension 12 of the frame 10. Vertical or other agitation may be imparted to the box 17.

Figure 4:
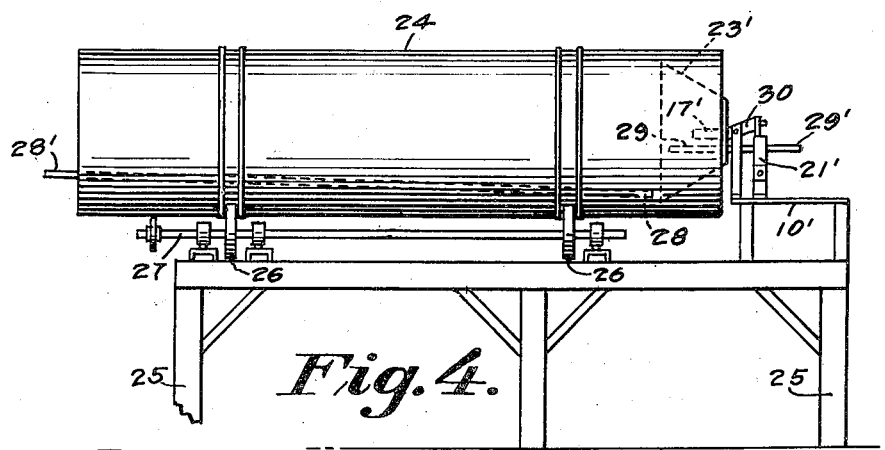
Figs. 4 and 5 illustrate, respectively, side and end elevation of a rotary drum for forming the nodules.
Figure 5:
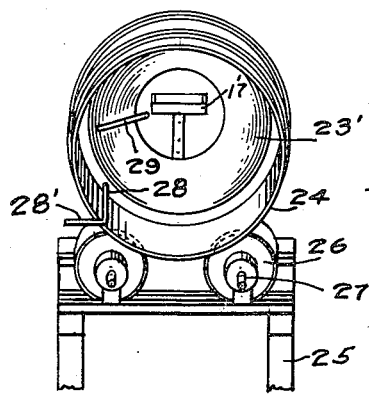

A suitable hopper or chute such as that indicated at 23 in Fig. 2 may be provided for receiving the nodules discharged by vibrating box 17, and chute 23 may lead directly to the baking apparatus, or to a nodula-shaping drum, one example of which is illustrated in Figs. 4 and 5, to be described.

In operation of the apparatus illustrated in Figs. 1, 2 and 3, in accordance with the method of the invention, a mass of pulverulent material, of which iron oxide may be used as an example, is mixed with sufficient evaporable liquid so as to form a plastic mass, the volume of liquid depending upon the nature and fineness of the pulverulent material. For example, for pulverulent iron oxide of a fineness such that 100% pasess a 100 mesh screen, with 60% to 90% passing a 325 mesh screen, the proper pasticity is attained by mixing the same with from 8% to 15% water by volume.

This plastic mass may be supplied to the box at 17, which is agitated by the vibrator 21 in a horizontal direction, the box sliding back and forth on its lugs 15, this movement being permitted by the slots 14 in the lugs 15 through which the bolts 13 pass. The weight of the mass on the screen 18, aided by the vibration, causes the mass to extrude by gravity through the meshes or openings 19 without substantial compaction. The suspended weight of the extrusions protruding from the underside of the screen 18, aided by the vibration, causes them to break off and fall to the chute 23 or other receptacle, as elongated, individual primary nodules, all of which have substantially the same length. Thus, nodules having a diameter of about one-half inch have a fairly uniform length of three-fourths to one inch.

Changing the sizes of the meshes or openings 19 in the screen 18 not only changes the diameter but also the length of the nodules for material of the same mesh size and plasticity. Similarly, different kinds of material, as well as different distributions of particle size in the same material, require a different amount of moisture in order to permit extrusion through the vibrating screen 18. Increase in the moisture content increases the rate at which the material is extruded through the screen openings 19, and also influences their length. It is preferred that the nodules retain sufficient moisture to have a smooth wet surface. Increase in the rapidity of vibration of the screen causes the extrusions to break off sooner, i. e., reduces their length, and, up to a point, vice versa.

These elongated extrusions, and the like, have little mechanical strength for furnacing and require hardening as by baking, at temperatures between about 900° C. and 1250° C., which greatly increases their strength without loss of porosity. Various methods and apparatus for baking them may be employed.

Instead of baking the nodules as discharged from the screen 18, they may be first further shaped or formed into more rounded units as by means of the rotary drum illustrated in Figs. 4 and 5. Referring to Fig. 4, numeral 24 designates a tubular drum inclined at an angle on a supporting frame 25 and revolving about its longitudinal axis on rollers 26 mounted on a driven shaft 27, so that the drum 24 is supported and driven in a manner similar to a rotary kiln. Burners 28 and 29 are positioned within the drum 24 for heating, if and when required, the interior surface of the drum 24 to keep it dry, so that plastic material of which the nodules are made does not stick and accumulate on the inner surface of the drum. The burner feed pipes 28' and 29' may be supplied with suitable fuel, such as fuel gas. A distributing cone 23' corresponding generally to the chute 23 shown in Fig. 2 is mounted in the upper or feed end of the drum 24 and may rotate therewith. Supported on a bracket 19' mounted on supporting frame 25 is the nodule-forming apparatus of Figs. 1, 2 and 3, including a vibrating screen box 17' vibrated by motor 21'. The screen box 17' may be positioned within cone 23' as shown in Fig. 4, so that a chute or hopper 30 may lead thereto from the exterior of the drum 24.

The nodules falling from vibrating screen 17' in Figs. 4 and 5 are discharged by the cone 23' into the rotating drum 24 where they are shaped by rolling into substantially spherical nodules. The rounded nodules are discharged from drum 24 directly to a suitable baking furnace directly or by means of a conveyor, for example.

Whether or not the intermediate shaping provided in the drum 24 is employed, the baking furnace to which the nodules are transferred may be a conventional furnace, preferably with combustion chambers at the sides, from which the products of combustion enter the shaft through ports to heat the glomerules as they descend. When baked at temperatures between about 900° C. and about 1250° C. the nodules possess substantially greater physical strength than the nodules that are air-dried, and the porosity of the baked nodules is high by reason of the expulsion of the water from the interstices between the particles constituting the nodules. The exact temperature of baking depends upon the physical and chemical character of the pulverulent material treated and the strength desired. In general, the higher the baking temperature the greater the strength of the nodules without greatly affecting their porosity, until the melting range is reached, at which point fusion causes closing of the pores, which is undesirable.

Although a preferred embodiment of the apparatus and a preferred process for conducting the invention have been illustrated and described herein, it is to be understood that the invention is not limited thereby but is susceptible to changes in form and detail within the scope of the appended claim.

I claim:

The method of forming substantially uniformly sized iron ore nodules having relatively great physical strength from finely pulverized iron ore which comprises mixing the finely divided iron ore with about 8 to 15 percent by volume of water, extruding the thereby produced plastic mass through a horizontally vibrating perforated plate, balling the thereby extruded plastic ore, and drying the balled plastic ore at temperatures between about 900 to 1250° centigrade.

EDWARD P. BARRETT.

REFERENCES CITED

The following references are of record in the file of this patent:

UNITED STATES PATENTS

| Number | Name | Date |
| --- | --- | --- |
| 75,417 | Harris | Mar. 10, 1868 |
| 1,106,087 | DuPont et al. | Aug. 4, 1914 |
| 1,500,856 | Walsh | July 8, 1924 |
| 1,630,660 | Ikeda et al. | May 31, 1927 |
| 1,908,979 | Herbst | May 16, 1933 |
| 2,149,920 | Kretchmer | Mar. 7, 1939 |
| 2,213,041 | Hermann | Aug. 27, 1940 |
| 2,316,726 | Spicer et al. | Apr. 13, 1943 |